Oct. 1, 1957 W. C. HAHN 2,808,202
CARRY UNIT FOR BINARY DIGITAL COMPUTING DEVICES
Filed July 21, 1951
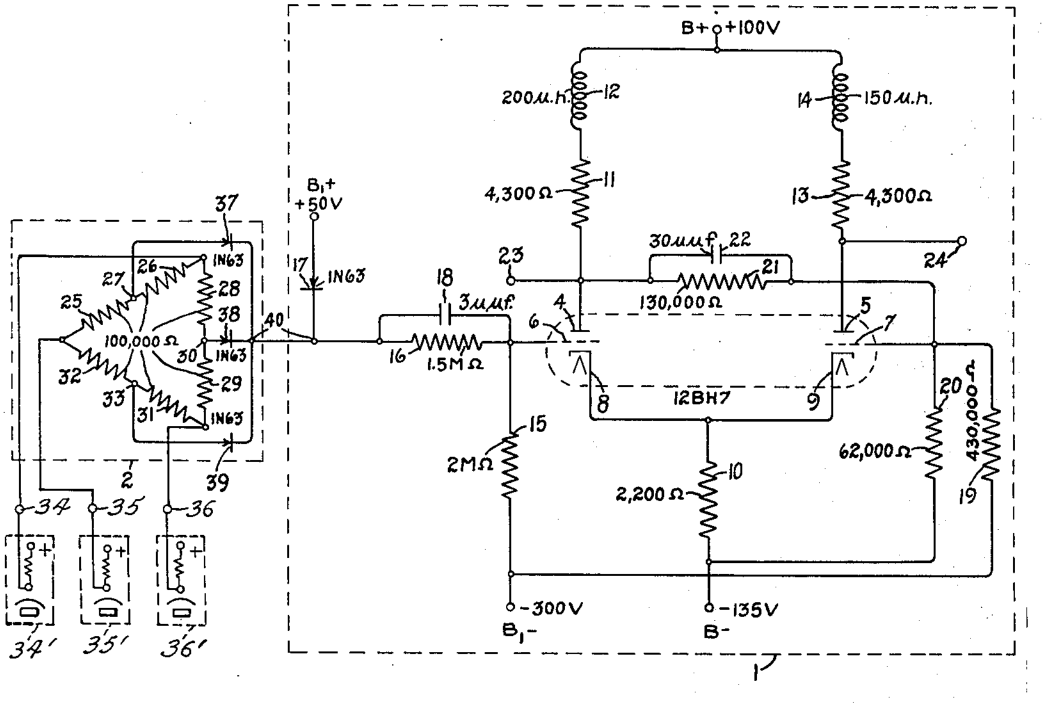
Inventor
William C. Hahn, Deceased,
Rose D. Hahn, Executrix.
by Merton D. Morse
Attorney.

2,808,202
Patented Oct. 1, 1957

2,808,202

CARRY UNIT FOR BINARY DIGITAL COMPUTING DEVICES

William C. Hahn, deceased, late of Scotia, N. Y., by Rose D. Hahn, executrix, Scotia, N. Y., assignor to General Electric Company, a corporation of New York Application July 21, 1951, Serial No. 237,852
6 Claims. (Cl. 235—61)

This invention relates to electronic digital computing devices which are capable of performing addition, multiplication, and other mathematical operations with binary numbers through the use of triggered multivibrator or flip-flop circuits arranged in registers and, more particularly, to means for effecting the carrying of binary numbers from one computer digit place to another in response to sensed potentials only according to the principles of the computer system and any such mathematical operation.

In the basic binary number system, of which there are many variations or "codes" to which the following reasoning applies, any decimal number may be expressed in terms of a series of binary digits, each having one of two values or designations, such as 1 and 0, true and false, good and bad, etc. This is done in the straight binary system by assigning to succeeding binary digit places decimal numerical values corresponding to the number 2 raised to succeeding powers and then indicating the presence or absence of a particular decimal value in the total decimal number by one or the other of the chosen two binary designations in the corresponding binary digit place. For example, the following table shows the binary expressions for the decimal numbers 1 through 11, the decimal value assigned to each binary digit being shown as 2 raised to a certain power, and its presence or absence in the binary expressions being indicated by a 1 or a 0 respectively.

| Binary Count | | | | Decimal Count |
|---|---|---|---|---|
| $2^3$ | $2^2$ | $2^1$ | $2^0$ | |
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| etc. | | | | |

Now in the mathematical operation of decimal system addition, for example, it is often necessary to carry a number from one column to the next in order to arrive at a true sum. In addition of binary expressions, the same necessity is sometimes present for carrying a designation from one digit place to the next in order to arrive at a true binary sum. Consider the binary addition of 7 and 2 as shown below:

```
0 1 1 1=7
0 0 1 0=2
---------
1 0 0 1=9
```

It is seen in this binary addition that the 1 and 0 in the first digit column on the right of the two binary expressions add to produce a 1 in the sum with no carry. The 1 and 1 in the second digit column add to produce a 0 in the sum, with a carry of 1 to the third digit column. Adding the 1 and 0 in the third digit column yields a 1, to which the carry of 1 is added to produce a 0 in the sum and a carry of 1 to the fourth digit column. Generally speaking, then, it may be said that a binary carry must take place in addition when at least two of three values—the two binary numbers to be added and the carry from the preceding digit place—are binary "1" 's.

In binary digital computers, the two possible binary numbers, "1" and "0," in a given digit place of a given expression are represented by opposite conduction states of a multivibrator circuit. This convention is carried out by designating that the multivibrator circuit stores a binary "1" when one anode therein is at its high, non-conducting potential and that it stores a binary "0" when the same anode is at its low, conducting potential. For simplicity in the following explanation and in no sense by limitation, let it be assumed, for example, that such high and low potentials are +90 volts and +10 volts, respectively, with reference to ground. If two such multivibrator circuits each represent by the potentials at one anode in each a binary number in the same digit place of two different binary expressions, a logic circuit or carry unit may be connected between the designated anodes of the multivibrator circuits to sense the potentials thereon and permit a carry to the next digit place when and only when both anode potentials are +90 volts and each multivibrator stores a binary "1." But a carry unit must do more than this. It must also sense whether or not there is a carry from the preceding digit place and permit a carry to the succeeding digit place when any two of the three binary numbers—the two numbers stored in the two multivibrator circuits and the number carried from the preceding digit place—are 1's. The carry unit may itself have an output terminal which is high in potential, say +90 volts, when it signifies "carry 1," and low in potential, say +10 volts, when it signifies "no carry." When the carry unit signifies "carry 1," the +90 volt potential at its output terminal may cause a gating circuit to be conductive, thereby allowing a clock pulse to trigger the particular multivibrator in the accumulator register if it is necessary to change the binary number stored in the accumulator multivibrator where the binary sum number is to appear.

The +90 volt potential at the carry unit output terminal may also be applied to the succeeding carry unit in order that the succeeding carry unit may properly determine if a carry is to be supplied to the second succeeding digit place. Essentially, then, a carry unit in one form must be a logic circuit which senses three input potentials—two multivibrator anode potentials, and a preceding carry unit output potential—and supplies and output potential indicative of "carry 1" if and only if at least two of the three input potentials indicate binary "1" 's, for example, if two of the three input potentials are high, say +90 volts.

It is an object of this invention to provide a new and improved carry unit for use in binary digital computing devices and in devices of like nature.

It is another object of this invention to provide a sensing logic circuit embodied in a carry unit which is of simplified and economical construction.

It is still another object of the present invention to provide a sensing logic circuit embodied in a carry unit which supplies a high or low output potential only when at least two of three input potentials supplied thereto are similarly high or low.

Briefly stated, the carry unit of the present invention includes a two-stage D. C. vacuum tube amplifier with positive feedback which increases its gain to infinity. Therefore, for a given low level of voltage applied to its control electrode input circuit, the amplifier is "turned completely off" and its output voltage is low; but when the input voltage is raised to or above a predetermined higher value, the amplifier is turned "completely on" and its output voltage is high. The control electrode input circuit comprises a three-legged resistance network arranged to define a triangular array or network, having three input terminals at the extremities of the legs. Each leg of the network is a tapped resistor, or two resistors in series, thereby forming three taps or junctions which are connected to a common point through three rectifiers oriented in like polarity to electrically isolate the three taps or junctions from one another. The potential at the common point determines the input control grid potential and, therefore, whether the amplifier is "on" or "off" and its output voltage is high or low. The action of the unique three-legged resistance network and the associated rectifiers is such that the amplifier is always "off" when at least two of the input potentials are low and is always "on" when at least two of the input potentials are high.

The novel features of the present invention are pointed out with particularity in the appended claims. For a better understanding of the invention, however, together with further objects and advantages thereof, reference should be had to the following description taken in conjunction with the accompanying drawing, in which the single figure is a schematic diagram of a preferred embodiment of the carry unit of the present invention.

Referring now to the drawing, there is shown a carry unit which is a preferred embodiment of this invention. The carry unit includes a two-stage D. C. amplifier 1, having positive feedback to increase its gain to infinity and which is supplied with input potentials through an input circuit 2 having a three-legged resistance network and a plurality of rectifiers therein. Amplifier 1 comprises a twin-triode electric discharge device 3, having therein a pair of anodes 4 and 5, a pair of control electrodes 6 and 7, and a pair of cathodes 8 and 9. It will be readily apparent that two separate triode discharge devices may be used in place of the single envelope twin triode device 3. Cathodes 8 and 9 are connected through a common cathode resistor 10 to a suitable source of negative potential indicated conventionally by B—. Anodes 4 and 5 are connected to a source of positive operating potential B+, anode 4 through a series combination of a resistor 11 and an inductance 12, and anode 5 through a series combination of a resistor 13 and an inductance 14. A control circuit for amplifier 1 is provided by control electrode 6, cathode 8 and resistor 10, while a biasing circuit for control electrode 6 is provided including two resistors 15 and 16 connected in series with a rectifier 17 between a suitable source of positive potential indicated by $B_1+$ and a source of negative potential indicated by $B_1—$. Control electrode 6 is connected at the junction between resistors 15 and 16, and the input potential from input circuit 2 is supplied to the junction between resistor 16 and rectifier 17. A pulse-passing capacitor 18 is paralleled with resistor 16 to improve the switching response of amplifier 1 when the input potential supplied by input circuit 2 changes from one side of its critical value to the other. A biasing circuit for control electrode 7 is provided by means of resistors 19 and 20 connected serially between the B— and $B_1—$ supply potentials respectively and to control electrode 7 as shown. To augment the feedback between the two triode sections of the twin triode device 3 afforded by cathode resistor 10, a coupling circuit made up of a resistor 21 and a capacitor 22 in parallel is connected between anode 4 and control grid 7. Output terminals 23 and 24 are connected to anodes 4 and 5 respectively and, as will be seen, are always at complementing potentials when amplifier 1 is either "on" or "off."

Input circuit 2 comprises a three-legged resistance network of resistors shown in the form of a triangular array having a first leg made up of two equal-valued resistors 25 and 26 forming a junction point 27 therebetween, a second leg made up of two equal-value resistors 28 and 29 forming a junction point 30 therebetween, and a third leg made up of two equal-value resistors 31 and 32 forming a junction point 33 therebetween. The corner connections of the network, i. e., the extremities of the legs of the network, form three input terminals 34, 35, and 36, connected respectively with the sources diagrammatically indicated at 34', 35' and 36'. Three rectifiers 37, 38, and 39 are connected in the same polarity as shown from junctions 27, 30, and 33 respectively to a common point 40 which, as indicated, serves to connect input circuit 2 to amplifier 1 since point 40 is the junction between resistor 16 and rectifier 17 in the biasing circuit for control grid 6. Rectifiers 37, 38, and 39, similarly poled as shown with respect to point 40, serve to electrically isolate junctions 27, 30, and 33 making the potential of any junction dependent only upon the input potentials and independent of the potentials of the other junctions.

The various circuit constants and values of the supply potentials shown in the drawing are given by way of example, for clarity of explanation, and in no sense by way of limitation. These circuit constants are those employed in carry units which have been constructed and which operate successfully in accordance with the present invention. To complete the background for the exemplary circuit constants and potentials shown, it should be stated that the exemplary circuit coacts with a computer system (not shown) which employs multivibrator circuits to store binary numbers, one anode in each multivibrator being chosen as the indicating anode. When the indicating anode is conducting current and is at its low potential of +10 volts, for example, the multivibrator is said to store a binary "0"; and when that anode is not conducting current and is at its high potential of +90 volts, for example, the multivibrator is said to store a binary "1." Of course, the designation could equally well be in the opposite sense, a low potential meaning a binary "1" and a high potential meaning a binary "0." The two different voltage levels indicating "1" and "0" may also be of values other than +90 and +10 volts. In keeping with the exemplary assumptions, however, output terminal 24 is made to have a potential of +90 volts when a "1" is to be carried, and made to have a potential of +10 volts when "no carry" or a "0" is to be carried.

Now in a mathematical operation, such as addition, for example, input terminals 34, 35, and 36 are connected, two to the indicating anodes of multivibrator circuits representing corresponding digits in two respective binary expressions to be added, and one to the output terminal of a similar carry unit (not shown) in the preceding digit place. Therefore, the potential applied to each of input terminals 34, 35, and 36 can be either low, +10 volts, or high, +90 volts, depending on whether the multivibrator or the preceding carry unit to which it is connected is indicating a "0" or a "1". If rectifier 17 and the $B_1+$ source were removed, the potential at point 40 could assume three levels—+10 volts when all input potentials are +10 volts, +50 volts when one input potential is +90 volts and the other two potentials are each +10 volts, and +90 volts when at least two of the input potentials are +90 volts.

If two or more of the three input terminals 34, 35, and 36 are at +10 volts, i. e., receive a "0" indication, there will be no effect on the potential of junction 40 caused by input circuit 2 and the original biasing voltage maintains amplifier turned "completely off", i. e., anode 5 conducting saturation current and residing at about +10 volts potential. Say, for example, that input terminals 34 and 35 are at +10 volts potential and that input terminal 36 is at +90 volts potential. The potentials at junction 27, 30, and 33 are then +10 volts, +50 volts, and +50 volts respectively. But the potential at junction 40 is always held at +50 volts by rectifier 17 connected as shown to the $B_1+$ supply potential as a clamping element, so that input circuit 2 has no effect on the potential at control electrode 6. The general statement may be made that input circuit 2 has no effect on the potential of control electrode 6 unless at least one of junctions 27, 30, and 33 is at a potential more positive than +50 volts, since rectifiers 37, 38, and 39 may be considered as open switches when their corresponding junction potentials are less positive than the potential of junction 40. It will be readily seen that when all three input terminals 34, 35, and 36 are at +10 volt potentials, that input circuit 2 does not act to change the original bias potential on control grid 6. Thus, the logic input circuit 2 produces no effect on the original bias of control electrode 6 when it senses two or more binary "0's," i. e., one or less binary "1's," from two multivibrator circuits and a preceding carry unit. As stated hereinbefore, these are the conditions under which output terminal 24 is to be at +10 volts, indicating thereby that "no carry" is to be made.

Now if two or more of the three input terminals 34, 35, and 36 are at +90 volts in potential, i. e., receive a "1" indication, there will be an increase of the potential at junction 40 and at control electrode 6 over the original bias potential. Say, for example, that input terminals 34 and 35 are at +90 volts potential and that input terminal 36 is at +10 volts potential. The potentials at junctions 27, 30 and 33 are then +90 volts, +50 volts, and +50 volts respectively. Therefore, rectifier 37 may be considered as a closed switch and rectifier 17 as an open switch—and the potential at junction 40 is 90 volts, causing a proportional increase in the potential at control electrode 6 over its original bias value. The general statement may be made that input circuit 2 increases the potentials of junction 40 and control electrode 6 over their original bias values whenever at least one of junctions 27, 30, and 33 is at a potential more positive than +50 volts. It will be apparent that when all three input terminals 34, 35, and 36 are at +90 volts potential that the effect on control electrode 6 is the same as if only two of these were at +90 volts potential. Therefore, the logic input circuit 2 produces a substantial increase in the potential of control electrode 6 over its original bias value when it senses two or more binary "1's," i. e., one or less binary "0's" from two multivibrator circuits and a preceding carry unit. These are the conditions under which output terminal is to be at +90 volts potential, indicating thereby that a "1" is to be carried to the next digit place.

The operation of amplifier 1 is as follows: When input circuit 2 has no effect on the original bias potentials of junction 40 and control electrode 6, i. e., two or more of the input terminals are at +10 volts potential and sensing "0's," resistors 15 and 16 forming a voltage divider between $B_1+$ and $B_1-$ cause the original bias potential of control electrode 6 to be highly negative, or at least more negative than the critical potential, so that amplifier 2 is turned completely "off". The left-hand section of twin-triode 3 is, therefore, cut off from current flow therethrough, and anode 4, as well as output terminal 23, is at approximately the B+ potential, say +90 volts. The right-hand section of twin-triode 3, however, is conducting saturation current, since control electrode 7 is biased more positively than control electrode 6 through the voltage dividing action of resistors 21 and 20 connected serially between anode 4, at +90 volts, and B−. The saturation current conducted through resistor 13 produces a large voltage drop thereacross which causes anode 5 and output terminal 24 to reside at a low potential, about +10 volts, thereby indicating when amplifier 1 is completely "off" that "no carry" is to be made. The voltage drop in cathode resistor 10 due to the current conducted by the right-hand section makes cathode 8 more positive with respect to control electrode 6, thereby further assuring that the left-hand section is cut off.

When input circuit 2 changes from a non-effective to an effective condition, i. e., at least two of the three input terminals 34, 35, and 36 sense +90 volt potentials indicative of "1" 's, the potential at junction 40 changes reasonably abruptly from +50 volts potential due to the $B_1+$ potential to +90 volts potential due to the potential of at least one of junctions 27, 30, and 33. This sudden positive change in potential at junction 40 is transmitted by capacitor 18 and appears across resistor 15, making control electrode 6 positive enough to initiate current conduction in the left-hand section of twin-triode 3. This same effect would be achieved if the change were not abrupt or if capacitor 18 were absent; but fast switching of amplifier 1 is desirable and it may be achieved in this prescribed manner. As this current conduction commences, the potential of anode 4 falls rather abruptly and the negative change in potential is transmitted through capacitor 22, since the voltage thereacross cannot change instantaneously, making control electrode 7 negative enough to cut off current flow in the right-hand section of twin triode 3. The amplifier 1 then stabilizes with anode 4 conducting saturation current, and residing at about +10 volts potential due to the voltage drop across resistor 11, and with anode 5 cut off from current flow and residing at approximately B+ potential of +90 volts to +100 volts. This condition prevails until the potentials at input terminals 34, 35, and 36 again combine to make input circuit 2 "ineffective," whereupon amplifier 1 switches back to its original state with anode 5 conducting and residing at about +10 volts potential.

The inductances 12 and 14 compensate for the anode capacity to ground and stray capacity, thus permitting increased rates of rise and fall of current in load resistors 11 and 13. As previously mentioned, the potentials of output terminals 23 and 24 complement each other, one is high when the other is low, and therefore the carry unit may serve in operating gating circuits which require either high or low gating potentials.

In practice, output terminal 24 is connected to one input terminal of the succeeding carry unit, and also to a gating circuit which is opened when the gating potential applied thereto is above a predetermined potential, say, +50 volts. Clock pulses for triggering one of the multivibrator circuits to cause it to store the proper sum binary number may therefore be passed through the gate if, and only if, the carry unit indicates "carry 1" by a +90 volts potential at the output terminal 24.

It is not essential that the biasing circuit for control elecrode 6 include rectifier 17 connected to a $B_1+$ supply potential as shown in the drawing. If rectifier 17 were omitted, the operation of the carry unit would be the same as explained hereinbefore, the potential at control electrode 6 becoming positive enough to turn amplifier 1 "completely on" only when the potential at one or more of junctions 27, 30, and 33 is at +90 volts in response to two or more of input terminals 34, 35, and 36 being supplied with +90 volts potentials. However, even if amplifier 1 were turned "completely off" due to +50 volt or +10 volt potentials at junctions 27, 30, and 33, current would be drawn through input circuit 2 and through resistors 16 and 15 to the $B_1-$ supply potential. This, in effect, would constitute loading on the devices, i. e., the multivibrator circuits and preceding carry unit, to which input terminals 34, 35, and 36 are connected, in order to supply this current. It is preferable, therefore, to eliminate this undesirable current loading by drawing an original biasing current from a $B_1+$ supply potential which is insufficient to turn amplifier 1 "completely on" but sufficient to prevent current flow through rectifiers 37, 38, and 39 whenever junctions 27, 30, and 33 are at either +10 volt or +50 volt potentials. When junction 40 rises to +90 volts signifying that a carry is to be made and amplifier 1 is to be turned "on," rectifier 17 prevents current flow from junction 40 to the lower potential $B_1+$ supply, and thus prevents unnecessary current loading on input circuit 2 and the devices connected to its input terminals. By the use of rectifier 17 connected to a $B_1+$ supply potential in the biasing circuit for control electrode 6, therefore, all current loading on input circuit 2 is eliminated when the potentials at junctions 27, 30, and 33 are at the lower two of three possible positive levels, i. e., +10, +50, and +90 volts; and when the potentials at junctions 27, 30, and 33 are at the highest of the three possible positive values, current loading on input circuit 2 to the $B_1+$ supply potential is eliminated.

It has been shown herein that the carry unit of the present invention includes a logic sensing circuit having three input terminals which, in connection with a two-stage positive feedback D.-C. amplifier having two stable states of conduction, provide a relatively high output potential when and only when at least two of three input potentials supplied thereto are relatively high. This corresponds with certain rules of binary operations, for example, addition, wherein a carry from one place to the next is made when and only when at least two "1"'s are present in the two digit places and the preceding carry to be added.

It will be apparent to those skilled in the art that the two resistors in each leg of the sensing network shown in the drawing need not be of equal resistance values if certain potential levels other than those given by way of example are to be established.

While the present invention has been described by reference to a particular embodiment thereof, it will be understood that numerous modifications may be made by those skilled in the art without actually departing from the invention. It is, therefore, intended in the appended claims to cover all such equivalent variations as come within the true spirit and scope of the foregoing disclosure.

What is claimed as new and desired to secure by Letters Patent of the United States is:

1. A carry unit for use in a binary digital computing device for producing one of two predetermined output potentials according to number information supplied thereto in the form of three input potentials, each being one of two selected possible levels, by components of said computing device; said carry unit comprising an electric discharge device amplifier having a control circuit and an output terminal; the potential of said output terminal being one or the other of said two predetermined output potentials when the potential supplied to said control circuit is respectively above or below a predetermined critical potential, a sensing input circuit including a triangular network of resistors electrically interconnected to form a continuous electrical circuit around the triangle and having three input terminals provided by the corners of said triangular network to receive said three input potentials, three junctions each in a different leg of said triangular network, three rectifiers each connected between a different one of said junctions and a common point in said control circuit, said rectifiers being similarly poled with respect to said point, said input circuit supplying a potential greater than said predetermined critical potential to said point in said control circuit only when at least two of the three input potentials applied thereto have a given one of said two selected levels.

2. A carry unit for producing one of two predetermined output potentials in response to number information supplied thereto in the form of three input potentials each being one of two selected levels by components of a binary digital computer system; said carry unit comprising an electric discharge device amplifier having a control circuit and an output terminal the potential of said output terminal being one or the other of said two predetermined output potentials when the potential supplied to said control circuit is above or below a predetermined critical potential respectively; a biasing circuit for biasing said control circuit potential at a value other than said predetermined critical potential; and a sensing input circuit including three resistors electrically interconnected to form a continuous triangular electrical circuit through said three resistors and having three input terminals provided by the corners of said triangular network to receive said three input potentials, three junctions each in a different leg of said triangular network, three rectifiers each connected between a different one of said junctions and a common point in said control circuit, said rectifiers being similarly poled with respect to said point to change the potential of said control circuit to the other side of said critical potential from said bias value only when at least two of said three input terminals are supplied with a given one of said two selected input potential levels.

3. A carry unit for producing one of two predetermined positive output potentials in response to number information supplied thereto in the form of three input potentials each being one of two selected positive values by components of a binary digital computer system; said carry unit comprising a two-stage positive feedback D.-C. amplifier having a control circuit and an output terminal; the potential of said output terminal being the higher or the lower of said two predetermined output potentials when the potential applied to said control circuit is respectively above or below a predetermined critical potential; a biasing circuit for biasing said control circuit potential at a value below said predetermined critical potential; a sensing circuit including a network having three resistors triangularly interconnected to form a continuous electrical circuit around the triangle, three input terminals at the corners of said triangular network, three junctions each in a different leg of said triangular network, three rectifiers each connected between a different one of said junctions and a common point in said control circuit, said rectifiers being similarly poled with respect to said point to change the potential of said control circuit to a value more positive than said predetermined critical potential only when at least two of said three input terminals are supplied with input potentials having the more positive value of said two selected positive values.

4. A sensing circuit, comprising a triangular array of resistive elements electrically interconnected to form a continuous electrical circuit around the triangle and having input terminals at the corners of said array for receiving input potentials of one or the other of two discrete values, each leg of said array comprising a pair of serially-connected resistors, the junction of the resistors of the respective pairs defining an output terminal, rectifier elements connected to said output terminals and similarly poled for low-resistance conduction away from said output terminals, thereby to render the potential at each output terminal dependent only on the potentials applied at said input terminals and independent of the potential at the other output terminals, said rectifier elements being interconnected to define a common junction for said asymmetrically conductive means, and biasing means including a source of unidirectional voltage and a further rectifier element in series with said source and coupled to said common junction, whereby the potential at said common junction is restrained at one or the other of two possible values, the greater of which occurs only when at least two of the three input potentials are at the greater of said two discrete values.

5. In signal responsive apparatus, a closed circuit loop comprising at least three re-entrantly connected resistive arms, a first signal source delivering time variable electric signals to one of the junctions between said arms, a second signal source delivering to a second of the junctions between said arms time variable electric signals characterized at times by peak values of like polarity and in time coincidence with peak values at said first junction, a third signal source delivering to a third of the junctions between said arms time variable electric signals characterized at times by peak values of like polarity in time coincidence with peak values at one of said first and second junctions, a connection point substantially at the midpoint of each of said arms, and a plurality of unilaterally conductive devices each individually connected between an individual one of said midpoints and a common point with electrodes of like polarity connected to said common point.

6. In signal responsive apparatus, a closed circuit loop comprising at least three re-entrantly connected resistive arms, a first signal source delivering time variable electric signals to one of the junctions between said arms, a second signal source delivering to a second of the junctions between said arms time variable electric signals characterized at times by peak values of like polarity and in time coincidence with peak values at said first junction, a third signal source delivering to a third of the junctions between said arms time variable electric signals characterized at times by peak values of like polarity in time coincidence with peak values at one of said first and second junctions, a connection point substantially at the midpoint of each of said arms, a plurality of unilaterally conductive devices each individually connected between an individual one of said midpoints and a common point with the same sense of conduction, and means including a unilateral conductor for restraining potential excursions of said common point in one direction.

References Cited in the file of this patent

UNITED STATES PATENTS

| | | |
|---|---|---|
| 2,042,234 | Lyle | May 26, 1936 |
| 2,503,765 | Rajchman | Apr. 11, 1950 |
| 2,539,616 | Gehman | Jan. 30, 1951 |
| 2,557,729 | Eckert | June 19, 1951 |
| 2,559,173 | Shawhan | July 3, 1951 |
| 2,563,589 | Den Hertog | Aug. 7, 1951 |
| 2,568,932 | Rajchman | Sept. 25, 1951 |
| 2,583,711 | Scowen | Jan. 29, 1952 |
| 2,590,950 | Eckert et al. | Apr. 1, 1952 |
| 2,609,143 | Stibitz | Sept. 2, 1952 |
| 2,632,845 | Goldberg | Mar. 24, 1953 |
| 2,634,396 | Solomon | Apr. 7, 1953 |

OTHER REFERENCES

Proc. of the IRE "Diode Coincidence and Mixing Circuits in Digital Computers," by Tung Chang Chen; pages 511 to 514; May 1950.

"Second Interim Progress Report," by the Institute for Advanced Study; Princeton, New Jersey; July 1, 1947; pp. 38–44.